Feb. 20, 1968  R. THOMAS ET AL  3,369,725
PIPELINE WELDING CLAMP

Filed March 31, 1965  4 Sheets-Sheet 1

Robert Thomas
Henry W. Shannon
INVENTORS

BY Browning, Simms,
Hyer & Eichenroht
ATTORNEYS

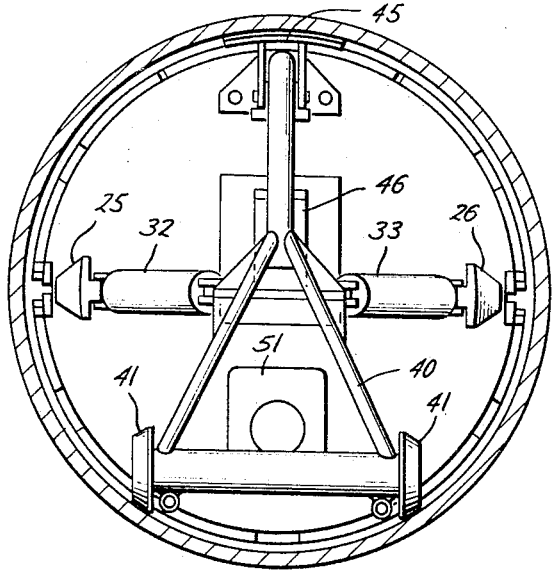
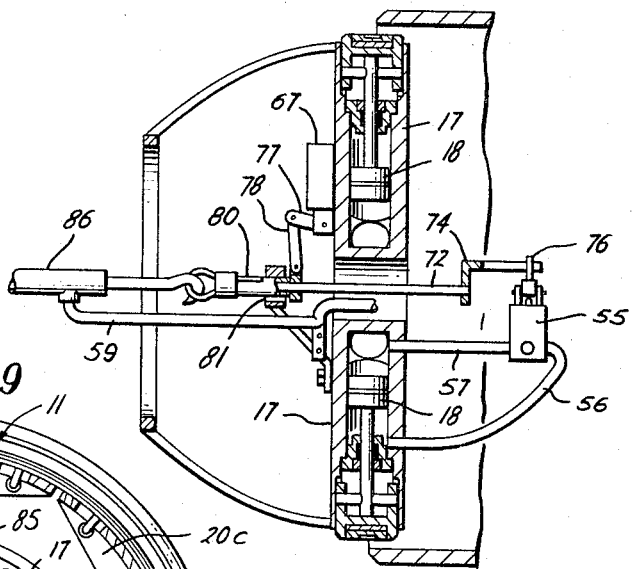
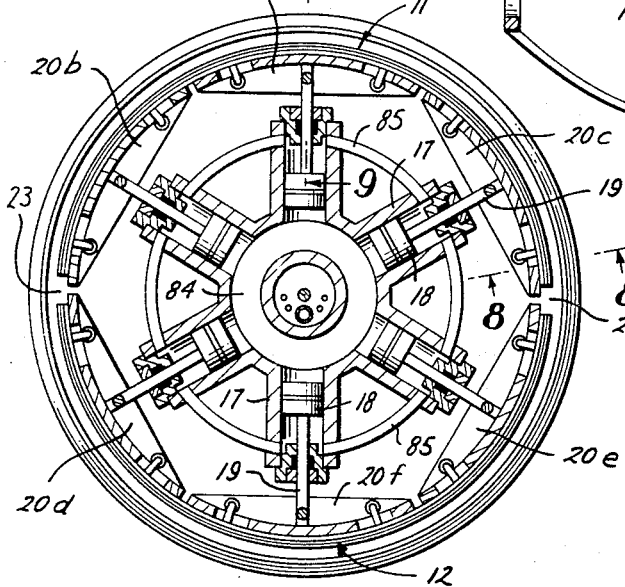
Robert Thomas
Henry W. Shannon
INVENTORS

Feb. 20, 1968 R. THOMAS ET AL 3,369,725
PIPELINE WELDING CLAMP
Filed March 31, 1965 4 Sheets-Sheet 3

Robert Thomas
Henry W. Shannon
INVENTORS

ATTORNEYS

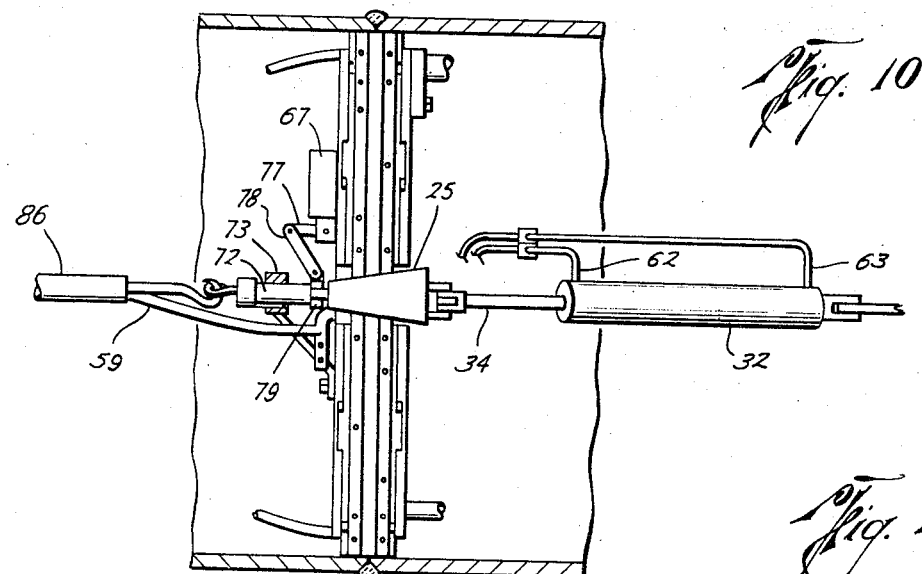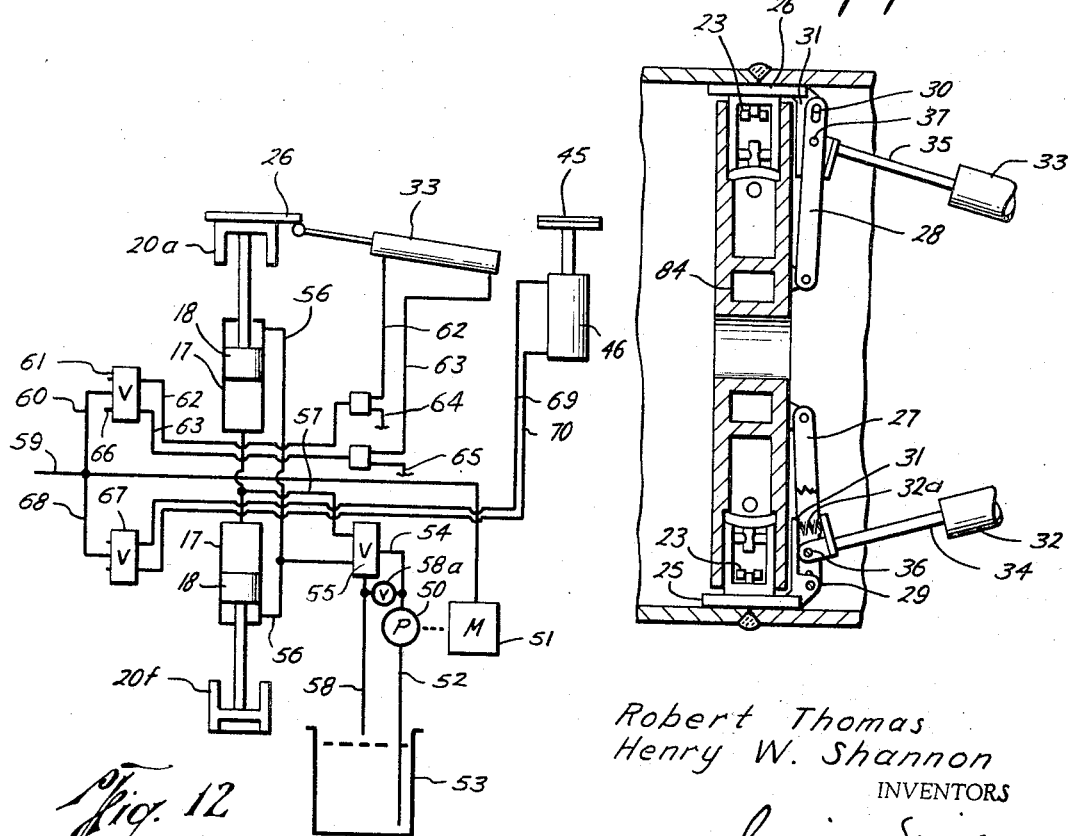

United States Patent Office 3,369,725
Patented Feb. 20, 1968

3,369,725
PIPELINE WELDING CLAMP
Robert Thomas and Henry W. Shannon, Houston, Tex., assignors to Thomas Contracting Company, Houston, Tex.
Filed Mar. 31, 1965, Ser. No. 444,228
9 Claims. (Cl. 228—50)

ABSTRACT OF THE DISCLOSURE

An internal pipeline welding clamp is disclosed. The clamp has two arcuate back-up shoes for expansion into engagement with the abutting adjacent ends of two pipe lengths. The back-up shoes bridge the gap between the ends and hold the ends in alignment while they are welded together. As the back-up shoes are moved outwardly into engagement with the pipe, their adjacent ends move apart. The ends of the shoes are at an angle to receive wedges moved between them along the inside surface of the pipe. The wedges span the gaps between the shoes and force the shoes into firmer engagement with the inside surfaces of the abutting pipe ends. Controls are provided for actuating fluid cylinders for expanding and contracting the back-up shoes, for moving the wedges into and out of position between the ends of the shoes, and for anchoring the clamp in the pipe. The controls are arranged so they can be operated only in a given sequence.

This invention relates to an improved internal pipeline welding clamp and to the controls for operating the same.

In the welding together of sections of pipe to lay a pipeline, it is essential that adjacent ends of the pipe sections be brought into alignment with each other and held in a fixed relationship during the welding operation. Internal pipeline welding clamps are used for this purpose. One of these clamps is inserted into the open end of one pipe length after which another pipe length is moved into place and positioned so that the ends of the two pipe lengths are properly spaced for welding. The clamp, which bridges the joint between the two pipe ends, is then expanded to bring the pipe ends into alignment and to securely hold them during the welding operation. Since the ends of the two pipe lengths are seldom, if ever, exactly round, the clamp should be able to exert enough force to bring both pipe ends into round so that they will be properly aligned for welding.

In addition to its aligning function, it is desirable that the welding clamp provide a welding back-up strip across the joint to be welded and extending continuously around the inside of the joint. This strip should lie close to the inside wall of the pipe to limit inward movement of any weld metal which may come through the joint and thereby prevent "icicles" and the like. For this reason, the strip should be made of a material to which the weld metal will not easily bond, such as copper, a ceramic material and the like. Also, where a gas shielded type of welding process is used, the back-up strip should provide a seal across the joint in order to limit escape of the shielding gas and to prevent exposure of the weld being laid as the stringer bead to the atmosphere inside the pipe. It will thus be seen that in order to permit these functions, the back-up strip should extend continuously around the inside of the pipe. Due to the variations in the average inside pipe diameter from pipe length to pipe length for any given nominal diameter pipe, there exists the problem of providing a back-up strip which can be positioned continuously around the inside of the pipe and yet accommodate the different average pipe diameters.

Therefore, it is an object of this invention to provide an internal pipeline welding clamp which affords an internal back-up strip which will always extend continuously around the inside of the pipe joint despite variations in average inside diameter of the pipe ends.

Another object is to provide such a clamp in which an expansion shoe assembly including a back-up strip extends substantially continuously around the inside of the pipe joint in order to more uniformly distribute the forces being applied to bring and hold the pipe ends in alignment and means are provided to bridge any gap or gaps between the ends of the expansion shoe despite variations in the size of the gap or gaps due to variations in average inner pipe diameters.

Another object is to provide such a clamp in which the bridging means also exerts a wedging action on the expansion shoe or back-up strip to force it even more tightly into engagement with the inner walls of the pipe despite variations in pipe diameter.

In the use of some internal pipeline welding clamps, and particularly in the use of the one which is the subject of this invention, it is necessary, in order to set the clamp or to release it, to carry out a number of operations in a particular sequence. These clamps are frequently operated by unskilled workers and the pipelining operation nearly always requires that they be operated in a hurry. Therefore, it can be seen that the desired sequence might not always be followed resulting in improper operation of the clamp and in slowing down of the pipelining operation. It would be desirable to have a control system for a pipeline clamp which is so interlocked that only the desired sequence of operations can be followed and it is accordingly an object of this invention to provide such a control system for an internal pipeline clamp.

Other objects, advantages and features of the invention will be apparent to one skilled in the art upon consideration of the specification, claims and drawings, wherein;

FIG. 4 is a view taken through a pipe joint of FIG. 1 along the line 4—4 showing a rear view of the clamp;

FIG. 5 is a vertical sectional view of the forward end of the clamp shown in FIG. 1 showing the expansion shoes in retracted position;

FIG. 6 is a vertical sectional view taken along the line 6—6 of FIG. 5 showing the radially movable shoe assemblies of the clamp in their retracted position;

FIG. 10 is an elevational view showing the pipe clamp in clamping position;

FIG. 11 is a vertical sectional view through the pipe clamp in clamping position, as shown in FIG. 10, but rotated 90°; and FIG. 12 is a schematic diagram of the hydraulic and pneumatic systems for operating the clamp.

In the embodiment shown, a pair of back-up shoe assemblies 11 and 12 are provided to be moved from a retracted position to an expanded position where they will grip the interior of two pipe ends and bridge the joint between them. As shown, each assembly extends nearly one-half way around the clamp so that they provide a continuous back-up for the joint except for the gaps between their ends.

Figure 9:
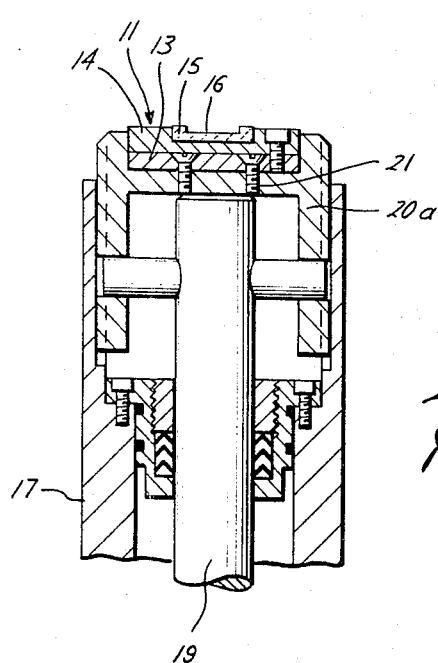
FIG. 9 is a sectional view taken along the line 9—9 of FIG. 6.

As best shown in FIG. 9, each assembly includes an inner strip 13 to which is fastened an outer strip 14. The outer strip is grooved along its length to receive a welding back-up strip 15 which is made of copper, ceramic material, or the like, so that any molten weld metal coming through the pipe joint will not stick to the welding strip. The welding strip is preferably provided with a groove 16 in its face which groove is wide enough to bridge across the joint being welded. This groove permits the weld metal to protrude slightly into the pipe without contacting the strip. Also, it permits the shoulders on the strip to either side of the groove to form seals with the inner walls of the pipe so that when an inert gas shielding welding process is used, the inert gas can fill the groove and shield the weld metal at the inside of the pipe from the atmosphere within the pipe. Also, the strip prevents escape of inert gas to the inside of the pipe by virtue of the seal it forms therewith.

Figure 8:
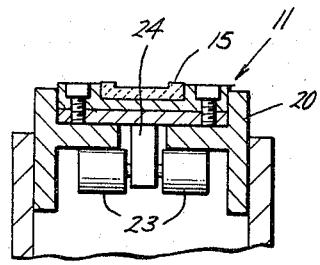
FIG. 8 is a sectional view taken along the line 8—8 in FIG. 6.

Means are provided for moving the back-up shoe assemblies radially into and out of engagement with the pipe. As best seen in FIG. 6, this means includes a plurality of hydraulic cylinders 17 each containing a piston 18. Each of the pistons is connected by a piston rod 19 to a respective one of pressure shoes 20a through 20f. As best seen in FIGS. 6, 8 and 9, the pressure shoes have an arcuate outer face which is grooved to receive the back-up shoe assemblies.

Since the pressure shoes are constrained to move radially outwardly, it will be apparent that as they do so, they tend to move apart circumferentially and the gaps between them will increase. In other words, the total circumference occupied by the pressure shoes will be greater when the shoes are expanded than when they are retracted. However, since the back-up shoe assembly cannot stretch, portions of it will slide in the grooves of some of the pressure shoes as the latter move outwardly in order to accommodate the increased circumference. To facilitate this, the back-up shoe assemblies are fastened, as by bolts 21 (FIG. 9), to pressure shoes 20a and 20f, respectively. However, the back-up shoe assemblies are not fastened so as to prevent endwise movement with respect to pressure shoes 20b and 20c, and 20d and 20e, respectively. Accordingly, when these pressure shoes move outwardly, the back-up shoe assemblies slide within the grooves in the face of these pressure shoes so as to maintain the back-up shoe assemblies in continuous contact with the pipe from one of their ends to the other. In so doing, of course, the gaps 22 and 23 between adjacent ends of the back-up shoe assemblies will increase in width and this increase will be dependent upon the average inside diameter of the pipe ends being clamped.

In order to assure retraction of the back-up shoe assemblies and yet permit the ends thereof to slide circumferentially with respect to the pressure shoes adjacent such ends, a sliding connection is provided between the pressure shoe and the back-up shoe assemblies adjacent the ends of the latter. As shown in FIGS. 6 and 8, these connections comprise a pair of rollers 23 connected by member 24 to the back-up shoe assembly and extending through a slot in the pressure shoe. The rollers 23 engage the inside of the pressure shoe thereby maintaining the ends of the back-up shoe assemblies in proper position and yet permitting the back-up shoe assemblies to move circumferentially of the pressure shoes.

As indicated above, the width of gaps 22 and 23 between the back-up shoe assemblies will vary with variations in average inside diameter of the pipe ends. In order to bridge these variable width gaps, a pair of bridging elements 25 and 26 are provided in a manner such that they can be moved into the gaps, when the back-up shoe assemblies are expanded, and bridge between them so as to thereby provide a continuous back-up over the entire inner circumference of the pipe despite variations in the diameter thereof. In a preferred form, the bridging elements 25 and 26 are formed in the shape of wedges and the ends of the two back-up shoe assemblies are cut at an angle approximating the angle of the sides of the elements 25 and 26. In this manner, not only will the bridging of the gaps be more effective despite variations in the widths thereof, but also the bridging elements can exert a sidewise or wedging force on the back-up shoe assemblies to aid in pushing them even more tightly against the inner wall of the pipe.

As illustrated, each of the bridging elements is mounted for movement from a retracted position (FIG. 4) to a bridging position (FIG. 10). The mounting means comprises levers 27 and 28 pivoted at their inner ends to the cylinder housing and at their outer ends, by pins 29 and 30, to the respective bridging elements or wedges. In order to permit the wedges to accommodate various pipe diameters, the pins 29 and 30 extend through slotted openings in the levelers 27 and 28 so that the wedges can move inwardly and outwardly with respect to the levers. The wedges have extensions 31 which engage a spring 32a (only one shown) in order that the wedges will be urged to pivot outwardly about their pivot pins. With this arrangement, and with the wedges in retracted position, their forward ends will first engage the pipe wall as the wedges are moved forward. Continued movement will cause the wedges to pivot inwardly until their outer surface lies parallel with the pipe wall and further movement will cause their pins 29 and 30 to move inwardly in the slots in levers 27 and 28 thereby keeping the wedges parallel to the pipe wall despite variations in distance they may move to wedging position as dictated by variations in internal pipe diameters.

In order to move the wedges, a pair of pneumatic cylinders 32 and 33 have their piston rods 34 and 35 pivotally connected, as at 36 and 37, to levers 27 and 28. Then upon proper application of air pressure to the cylinders, the wedges can be moved between retracted and wedging position.

The equipment thus far described is mounted upon a suitable frame or body 40 which can be equipped with wheels 41 to facilitate moving the clamp into a pipe end and also to move it out through the length of pipe which has last been welded in the pipeline. In addition, an upper wheel 42 is provided to help maintain the clamp centered in the pipe and to prevent its tipping as it is being moved. In order to accommodate varying pipe diameters, wheel 42 is mounted on a lever 43 which is pivoted to the frame at 44 and urged outwardly at its other end by a spring 45. In this manner, the spring will permit the wheel to move inwardly to accommodate variations in pipe diameter and yet will urge the wheel 42 into snug engagement with the pipe to maintain the clamp centered.

Figure 1:
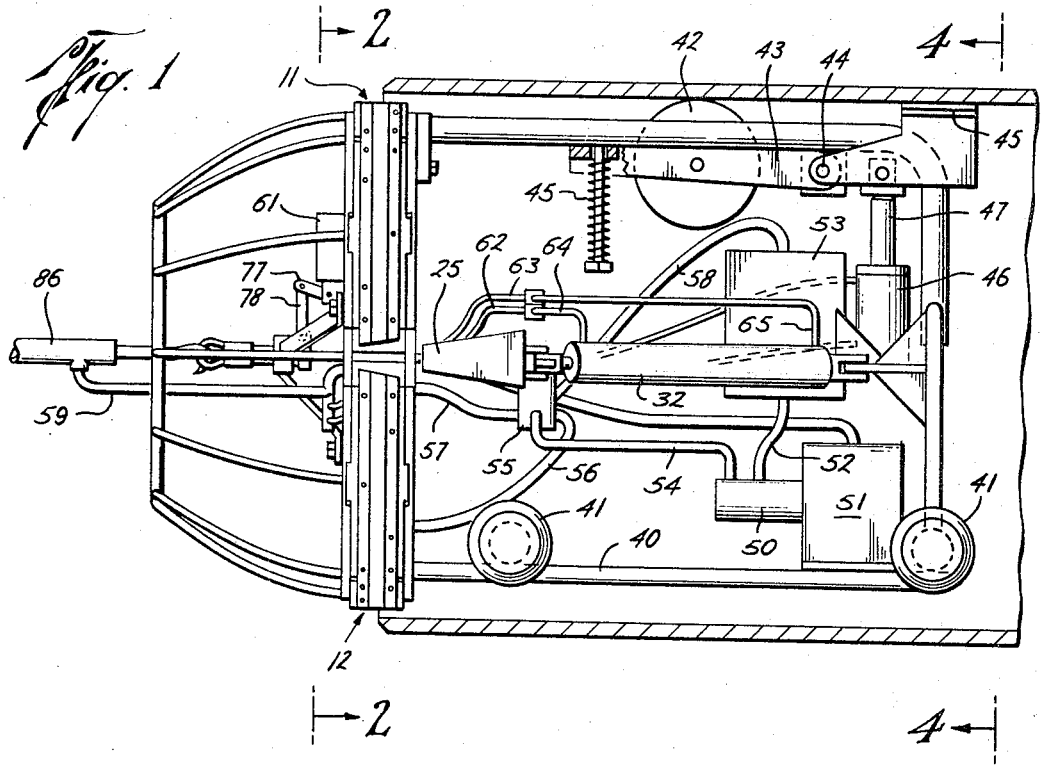
FIG. 1 is a vertical sectional view through a pipe end showing a preferred embodiment of a pipeline welding clamp constructed in accordance with this invention positioned in the end of the pipe, the welding clamp being shown in elevation.

After the clamp has been inserted in the open end of a pipe, and properly positioned a shown in FIG. 1, it is desirable to clamp it in place so that it cannot move as an added pipe length is being stabbed over the end of the part of the clamp extending from the pipeline and positioned for welding. To provide this, suitable clamping means can be employed. In the illustrated embodiment, this includes a brake shoe 45 which is also pivoted at 44 and adapted to move outwardly into tight engagement with the pipe by a pneumatic cylinder 46 connected to the brake shoe by a piston rod 47. Thus by inserting the clamp into the pipe end, and by suitable manipulation of the pneumatic controls, as described below, the clamp can be effectively locked in position by forcing the brake shoe into tight engagement with the pipe.

One form of a combination hydraulic and pneumatic system for operating the various equipment described above is shown schematically in FIG. 12. In this particular embodiment, the pressure shoes are operated hydraulically while the wedges and clamps are operated pneumatically. Thus a hydraulic pump 50, driven by an air motor 51, is connected via line 52 to take suction from a hydraulic reservoir 53. The pump discharges via line 54 to a four-way valve 55. The valve has a line 56 connecting it with the cylinders 17 on one side of the pistons 18 and a line 57 connecting it to the other side of the pistons. It also has a return line 58 connecting it to the reservoir. With this construction and with the valve 55 in one position, fluid discharged from the pump via line 54 will pass through line 57 to urge the pistons 18 outwardly while at the same time permitting fluid on the other side of the pistons to return to the reservoir via line 56, valve 55 and line 58. Upon reversal of the valve, the pump discharge will pass through line 56 to the other side of pistons 18 causing them to retract with fluid on the inner sides passing through line 57, valve 55 and line 58 back to the reservoir.

Since all of cylinders 17 are connected to a single source of hydraulic power fluid, it will be seen that by generating sufficient pressure at the pump discharge, the pipe ends will be urged into round. In order to limit the force which can be applied to the pipe ends and prevent yielding of the same, a by-pass relief valve 58a can be provided between the pump discharge and the reservoir. It can be set to limit the pressure applied to pistons 18 to be less than a predetermined value thereby preventing yielding of the pipe ends.

A source of pneumatic pressure can be passed via line 59 and 60 to the inlet side of four-way valve 61. One port of this valve is connected via line 62 to one end of wedge setting cylinder 33 while the other end of this cylinder is connected via a line 63 to another port in the four-way valve. The other wedge setting cylinder 32 can be connected by lines 64 and 65 in a similar manner. With this construction with valve 61 in one position, air is applied via line 62 to the wedge setting cylinders to retract the wedges while at the same time exhausting the other ends of the wedge setting cylinders through a line 63 and vent 66. Upon reversal of valve 61, the reverse action occurs to advance and set the wedges.

Similarly, another four-way valve 67 is connected to line 59 via line 68 and by lines 69 and 70 to opposite ends of brake shoe cylinder 46. Then when valve 67 is in one position, air will be applied to cylinder 46 to urge brake shoe 45 outwardly and upon reversal of valve 67, air will be applied to retract the brake shoe.

Figure 2:
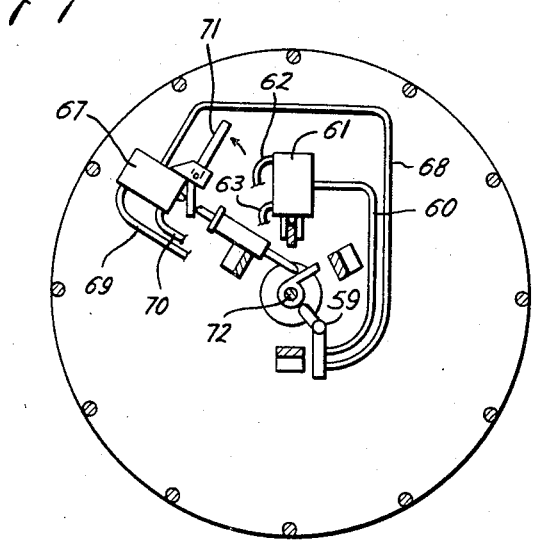
FIG. 2 is a sectional view taken along the line 2—2 of FIG. 1 illustrating part of the control system of the clamp.
Figure 7:
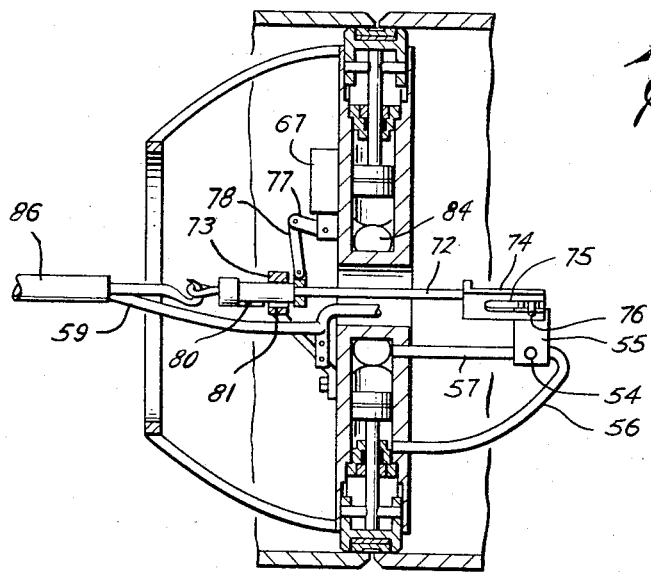
FIG. 7 is a view similar to FIG. 5 but showing the shoe assemblies in expanded position.

The proper operation of the illustrated embodiment involves the following sequence of events in order to set the clamp: (1) setting brake shoe clamp 45, (2) expanding the pressure shoes to urge the back-up shoe assemblies into engagement with the pipe, and (3) moving the wedges into position between the ends of the back-up shoe assemblies. In releasing the clamp, the reverse sequence should be followed. Therefore, an interlocking means is provided to manipuate the various control elements, such as valves 55, 61 and 67, such that the desired sequence of operation must be adhered to in order to operate the clamp. Thus brake shoe control valve 67 is provided with an actuator 71 (FIG. 2). After the clamp has been positioned in one end of a pipe, actuator 71 is manually moved from its FIG. 3 to its FIG. 2 position thereby valving air into line 70 to set the brake shoe. A control rod 72 is journaled for actual sliding and rotating movement in a support 73. Mounted on this control rod is a clevis 74 having a slot 75 therein to slidably engage an actuator 76 for valve 55. With the control rod rotated to the position shown in FIG. 5, actuator 76 is positioned so that valve 55 passes high pressure hydraulic fluid through line 56 to the outer ends of pistons 18 in order to retract the same. However when the control rod has been rotated to the position shown in FIG. 7, valve 55 is actuated to pass the high pressure hydraulic fluid through line 57 to the inner ends of the pistons to expand the pressure shoes. Therefore, it can be seen that a rotatable means is provided to actuate the control means for expanding and retracting the back-up shoe assemblies.

The wedge control valve 61 is provided with an actuator 77 which is so connected to the actuating rod 72 that reciprocation of the rod actuates the valve. Thus, a link 78 can be pivotally fastened to actuator 77 and to a collar 79 fixed to the control rod. Then with the control rod in the position shown in FIG. 7, valve 61 passes air through the line 62 to wedge cylinders 32 and 33 to cause the wedges to be retracted. On the other hand, when the rod 72 is moved axially to its FIG. 10 position, valve 61 passes air through line 63 to wedge cylinders 32 and 33 so as to advance the wedges into wedging position as shown in FIG. 10.

In order to prevent the wedges from being advanced to wedging position before the back-up shoe assemblies have expanded, means are provided to prevent reciprocation of the control rod (so as to cause the wedges to be advanced) until the rod has been rotated to cause the back-up shoe assemblies to be expanded. Such means is illustrated as a key and slot arrangement with a key 80 being located on shaft 72 and a slot 81 in support 73. Thus with the shaft 72 in the FIG. 5 position, the key and slot are not in alignment and the rod cannot be moved axially to advance the wedges until it has been rotated to actuate valve 55 to expand the back-up shoe assemblies. Key 80 and key slot 81 are located relative to each other such that when the shaft has been so rotated, they will be in alignment and the shaft can be pushed from its FIG. 5 to its FIG. 10 position. This causes the wedges to be advanced. Conversely, the key and slot arrangement prevent the shaft from being rotated when it is in the FIG. 10 position so as to retract the back-up shoe assemblies prematurely. It is first necessary to pull the shaft to release the key from the slot and this movement causes the wedges to be retracted. The shaft can then be rotated to its FIG. 5 position to retract the back-up shoe assemblies.

Figure 3:
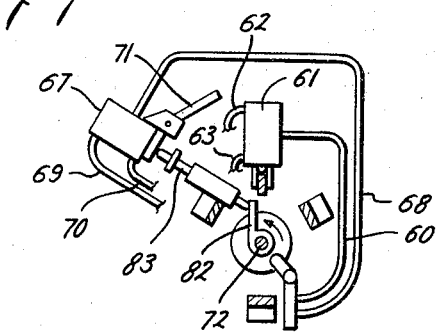
FIG. 3 is a view similar to FIG. 2 showing the controls when moved to another position.

Means are provided to actuate the brake valve 67 to release the brake responsive to rotation of the shaft to retract the back-up shoe assemblies. As shown in FIG. 3, such means can include an arm 82 fixed to shaft 72 and engageable with a slidable pin 73 which in turn engages a part of the valve actuating member 71. Thus the actuating member 71 can be manually set in its FIG. 2 position to expand the brake clamp. Shaft 72 will then be in its FIG. 2 position. However, when the clamp is to be released, rotation of shaft 72 to retract the back-up shoe assemblies will also advance pin 73 to move valve actuator 71 to its FIG. 3 position. This applies air to cylinder 46 to retract the brake shoe.

While the pistons 17 and 18 can be provided as individual assemblies, it is preferred that all of the cylinders 17 be incorporated in a single housing as illustrated in FIG. 6. The inner ends of the cylinders are in open communication with an annulus 84 which is connected to line 57, as shown in FIG. 5. In this way a single hydraulic connection to the housing suffices to provide pressure fluid to all of the pistons 18 and the pressure on the pistons will be equal. Conveniently, the other ends of cylinder 17 can be placed in fluid communication with each other by a series of lines 85. Then line 56 can be connected into only one of the outer ends of cylinders 17 and thereby will be in communication with all of the outer ends of pistons 18.

After the pipe joint has been welded, the clamp must be moved through the newly added length of pipe. This can be done by a rod 86 which can also conveniently support air line 59. If desired, an air motor drive to one of wheels 41 can be used to propel the clamp through the pipe.

While reference has been made to the use of pneumatic and hydraulic media for actuating the various components, it will be understood that the system can be all pneumatic or all hydraulic or various combinations of each. Also, various mechanically driven linkages can be used to actuate the various elements of the clamp including the back-up shoe assemblies, bridging elements and brake shoes. Moreover, while it is usually preferred to use two back-up shoe assemblies, more or less can be used with resultant obvious advantages and disadvantages.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An internal pipeline welding clamp for aligning adjacent ends of two pipe lengths and to provide back-up across the joint between the pipe lengths during a welding operation, comprising, in combination, a split back-up ring, means for moving the ring into and out of engagement with the pipe along the entire length of the ring, a wedge, means for moving the wedge into and out of engagement with the pipe and the ends of the ring when engaged with the pipe, to further spread the ends and to cooperate with the ring to provide a continuous back-up for the joint, first control means operatively associated with the split ring moving means, second control means operatively associated with the wedge moving means, a control rod for axial and rotary movement relative thereto, connecting means between the rod and first and second control means so that rotation of the rod operates the first control means and axial movement of the rod operates the second control means, and means for preventing axial movement of the rod until the rod has been rotated sufficiently to operate the first control means to expand the split ring and for preventing rotation of the rod until the rod has been moved axially sufficiently to operate the second control means to the wedge.

2. The clamp of claim 1 in which the last mentioned means includes a collar fixed against movement and slidably and rotatably receiving the rod, one of the collar and rod having a key slot and the other a key that engages with the slot and prevents axial movement of the rod except when the key is in alignment with the key slot.

3. The clamp of claim 1 wherein the clamp also has a brake shoe, means for moving the shoe into engagement with the pipe to prevent movement of the clamp, a third control means operatively associated with said shoe moving means, and means for operating said third control means to retract said shoe responsive to rotation of the rod in a direction to retract said split ring.

4. An internal pipeline welding clamp for aligning the ends of two pipes to be welded together, comprising, in combination, a back-up ring having at least two opposing ends, means for moving the ring between expanded and retracted positions, a bridging element, means for moving the bridging element between an extended position between said opposing ends to bridge the gap therebetween when the ring is in expanded position and to a retracted position, first and second control means respectively operatively associated with the ring moving means and said bridging element moving means, actuating means mounted on the clamp for movement in different directions, connecting means between the actuating means and the first and second control means so that movement of the actuating means in one direction operates the first control means and in another direction operates the second control means, and means preventing movement of the actuating means in said other direction until it has been moved sufficiently in said one direction to operate the first control means to expand the ring and for preventing movement of the actuating means in said one direction until the actuating means has been moved in said other direction sufficiently to operate the second control means to retract the bridging element.

5. The clamp of claim 4 further comprising a brake for holding the clamp in place in a pipe, means for moving the brake into holding position, a third control means operatively associated with said brake moving means, and means for operating said third control means to release said brake responsive to movement of the actuating means in said other direction to retract said ring.

6. An internal pipeline welding clamp for aligning adjacent ends of two pipe sections and for providing a back-up for the pipe joint being welded comprising, in combination, a body, an arcuate radially expansible and retractable back-up shoe means mounted on the body and adapted to extend substantially entirely around the inner wall of the pipe and across the joint between the pipe ends, said back-up means being axially split at least at one point so as to provide opposing ends at an angle with each other which move apart to form a gap therebetween upon expansion of the back-up means, the width of the gap being dependent upon the degree of expansion of the back-up means, means for expanding and retracting the back-up means, a wedge constructed to bridge across said adjacent ends when inserted in said gap and to abut at least one pipe end despite variations in width of said gap due to variations in expansion of the back-up means, means mounted on the body for moving the wedge axially of the back-up means from a retracted position to a bridging position between said adjacent ends and in abutment with at least one pipe end, said wedge moving means including a member pivotally connected to the body and to the wedge for swinging in an arc as it is moved between bridging and retracted positions and resilient means urging the wedge to pivot toward the pipe.

7. An internal pipeline welding clamp for aligning adjacent ends of two pipe sections and for providing a back-up for the pipe joint being welded comprising, in combination, a body, an arcuate radially expansible and retractable back-up shoe means mounted on the body and adapted to extend substantially entirely around the inner wall of the pipe length and across the joint between the pipe ends, said back-up means being axially split at least at one point so as to provide opposing ends which move apart to form a gap therebetween upon expansion of the back-up means, the width of the gap being dependent upon the degree of expansion of the back-up means, means for expanding and retracting the back-up means, bridging means constructed to bridge across said adjacent ends when moved axially along the inner wall of the pipe length and inserted into said gap to abut at least one pipe end despite variations in width of said gap due to variations in expansion of the back-up means, means mounted on the body for moving the bridging means axially of the back-up means from a retracted position to a bridging position between said adjacent ends and in abutment with at least one pipe end, and first and second control means respectively operatively associated with the back-up means, expanding and retracting means and said means for moving said bridging means, actuating means mounted on the clamp for different movements, connecting means between the actuating means and the first and second control means so that a first movement of the actuating means operates the first control means and a second movement operates the second control means, and means preventing the second movement of the actuating means until said first movement has caused the actuating means to operate the first control means to expand the back-up means and for preventing said first movement of the actuating means to retract the back-up means until the actuating means have made said second movement sufficiently to operate the second control means to retract the bridging means.

8. The clamp of claim 7 wherein said bridging means includes a wedge and said opposing ends are at an angle with each other to receive the wedge therebetween.

9. The clamp of claim 8 wherein the wedge is pivotally connected to a member which is pivotally connected to the body for swinging the wedge in an arc as it is moved between bridging and retracted positions, and resilient means urging the wedge to pivot toward the pipe.

References Cited

UNITED STATES PATENTS

| 1,962,351 | 6/1934 | Kane | 228—50 |
| 1,980,419 | 11/1934 | Martin et al. | 228—50 |
| 3,261,529 | 7/1966 | Pagan | 228—50 |

RICHARD H. EANES, Jr., *Primary Examiner.*

JOHN F. CAMPBELL, *Examiner.*

M. L. PAIGUS, *Assistant Examiner.*